United States Patent
Yokoi (10) Patent No.: US 9,246,585 B2
(45) Date of Patent: Jan. 26, 2016

(54) SYSTEM AND METHOD FOR VISIBLE LIGHT COMMUNICATION

(75) Inventor: Atsuya Yokoi, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 13/511,455

(22) PCT Filed: Nov. 26, 2010

(86) PCT No.: PCT/KR2010/008468
§ 371 (c)(1),
(2), (4) Date: May 23, 2012

(87) PCT Pub. No.: WO2011/065787
PCT Pub. Date: Jun. 3, 2011

(65) Prior Publication Data
US 2012/0275796 A1    Nov. 1, 2012

(30) Foreign Application Priority Data

Nov. 27, 2009  (JP) .................................. 2009-269855
Aug. 27, 2010  (KR) ...................... 10-2010-00883528

(51) Int. Cl.
H04B 10/00      (2013.01)
H04B 10/114     (2013.01)
H04B 10/116     (2013.01)

(52) U.S. Cl.
CPC .......... *H04B 10/1141* (2013.01); *H04B 10/116* (2013.01)

(58) Field of Classification Search
None
See application file for complete search history.

(56) References Cited

U.S. PATENT DOCUMENTS

| 7,889,999 B2* | 2/2011 | Ann | H04B 10/1141 398/172 |
| 8,433,203 B2* | 4/2013 | Yokoi | H04B 10/116 398/118 |
| 2002/0171639 A1* | 11/2002 | Ben-David | G06F 3/1454 345/207 |
| 2003/0011832 A1* | 1/2003 | Chang | G01J 1/32 358/518 |

(Continued)

FOREIGN PATENT DOCUMENTS

| JP | 2001-203609 A | 7/2001 |
| JP | 2003-318836 A | 11/2003 |

(Continued)

OTHER PUBLICATIONS

Giese, Jochen, Constellation Design Under Channel Uncertainty, 2005, Doctoral Thesis, Stockholm, Sweden.*

*Primary Examiner* — Ken Vanderpuye
*Assistant Examiner* — Jai Lee
(74) *Attorney, Agent, or Firm* — Jefferson IP Law, LLP (57) ABSTRACT

A transmitter in a visible light communication system is provided, in which a plurality of light sources emit light in different colors, a data converter converts data to predetermined chromaticity coordinates, a data transmitter emits light having a chromaticity corresponding to the chromaticity coordinates by controlling light intensity of each of the light sources, and a pre-light emitter emits light having chromaticities corresponding to all chromaticity coordinates by controlling the light intensity of each of the light sources, before the light intensity control of the data transmitter.

10 Claims, 6 Drawing Sheets

(56) References Cited

U.S. PATENT DOCUMENTS

| | | |
|---|---|---|
| 2006/0120481 A1 | 6/2006 | Hong et al. |
| 2008/0094244 A1 | 4/2008 | Oh et al. |
| 2009/0214225 A1* | 8/2009 | Nakagawa ......... H04B 10/1149 398/191 |
| 2010/0034540 A1* | 2/2010 | Togashi ............... H04B 10/116 398/118 |
| 2010/0135673 A1 | 6/2010 | Son et al. |
| 2010/0247112 A1 | 9/2010 | Chang |
| 2011/0200338 A1 | 8/2011 | Yokoi |

FOREIGN PATENT DOCUMENTS

| | | |
|---|---|---|
| JP | 2006-295766 A | 10/2006 |
| JP | 2007-13485 A | 1/2007 |
| JP | 2007-259111 A | 10/2007 |
| JP | 2008-252570 A | 10/2008 |
| JP | 2010-98574 A | 4/2010 |
| WO | 2008/129742 A1 | 10/2008 |

* cited by examiner

SYSTEM AND METHOD FOR VISIBLE LIGHT COMMUNICATION

TECHNICAL FIELD

The present invention relates to a communication system and method, and more particularly, to a visible light communication system and method for conducting communication using visible light.

BACKGROUND ART

Recently, optical communication technology using visible light has attracted attention. Especially along with the rapid proliferation of lightings using lighting emitting devices such as Light Emitting Diodes (LEDs), extensive research has been conducted to realize a very convenient communication environment (a visible light communication system) utilizing indoor and outdoor lighting devices. Considering influence on human bodies and medical equipment, LED is the most promising candidate as a lighting device for optical communication. However, the transmission rate of data for optical communication depends on the response speed of a light emitting device or a driving circuit. Thus Laser Diode (LD) or Super Luminescent Diode (SLD) that has a higher response speed than the LED is a promising candidate, when high data rates are needed.

In addition, techniques for using Red, Green, Blue (RGB) LEDs and stably transmitting a large amount of data in a signal emitted by an LED have been proposed. These techniques include a multi-chromaticity transmission scheme. When RGB LEDs are used, the intensity of light emitted from each LED can be appropriately controlled, to thereby control the chromaticity of light observed by a receiver. According to the multi-chromaticity transmission scheme, a plurality of symbol points are set at chromaticity coordinates on a color system and data having a plurality of bits is mapped to a symbol point, for transmission. When the data is mapped to the symbol point, the intensity of light emitted from each LED is controlled to light having the chromaticity corresponding to the symbol point, as received at the receiver.

Figure 4:
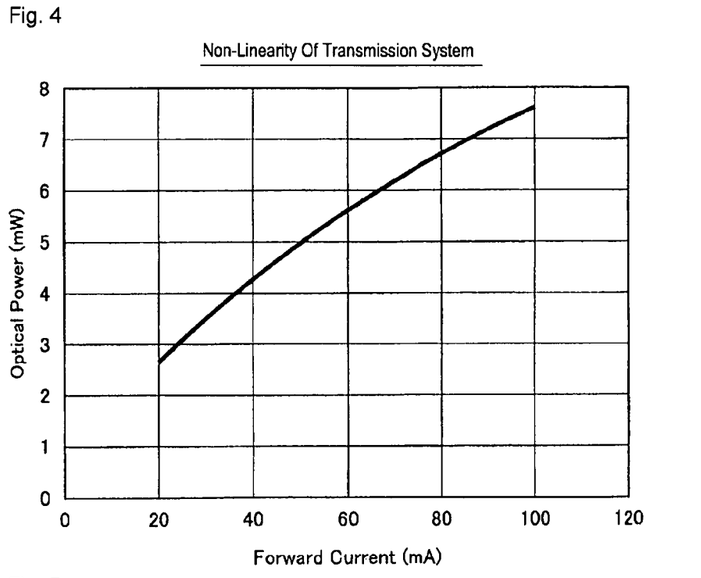
FIG. 4 illustrates non-linearity of a transmission system.

The intensity of light emitted from each LED can be controlled by controlling the magnitude of current pulses applied to the LED. The problem herein is non-linearity inherent to the light emission characteristics of the LED. In most cases, the light intensity of an LED increases non-linearly as the magnitude of current pulses increases (see FIG. 4). If light emission is controlled, ignoring the non-linearity of the LED, the chromaticity of light observed by the receiver does not match a symbol point at chromaticity coordinates. To prevent this disparity, the disparity needs to be compensated for by controlling a complex current, taking into account the non-linearity of the LED or predicting the disparity from the symbol point.

No method for compensating for the disparity of chromaticity has been specified in a visible light communication system. However, methods for compensating for non-linear distortion attributed to the non-linear characteristics of a transmission circuit in a wireless communication system are disclosed, for example, in Japan Laid-Open Patent No. 2001-203609 and Japan Laid-Open Patent No. 2001-295766. Japan Laid-Open Patent No. 2001-203609 discloses the configuration of a wireless communication system in which a receiver estimates an amplitude distortion resulting from applying a linear modulated signal to a non-linear circuit and compensates for the amplitude distortion of a received signal based on the estimation result. Japan Laid-Open Patent No. 2001-295766 discloses a structure that calculates an initial non-linear distortion coefficient (a deviation from a symbol point) by a training operation and compensates for the non-linear distortion of a received signal using the initial non-linear distortion compensation coefficient.

DISCLOSURE OF INVENTION

Technical Problem

However, the conventional methods commonly involve a process of estimating a deviation from a symbol point on a constellation in order to compensate for the non-linear distortion of a received signal. The estimation requires a certain complex circuit configuration. Compared to a wireless communication system, a visible light communication system conducts communication using light having good rectilinearity via a short, prospective transmission line. Therefore, the state of the transmission line rarely changes with complexity, compared to a transmission line in the wireless communication system.

A main component that causes non-linear distortion is confined to a light emitting device or a light receiving device. Accordingly, as far as the fixed non-linear characteristics of the light emitting device or the light receiving device, a complex process such as the distortion compensation methods for the wireless communication system is not necessary.

Solution to Problem

An aspect of embodiments of the present invention is to address at least the problems and/or disadvantages and to provide at least the advantages described below. Accordingly, an aspect of embodiments of the present invention is to provide a novel or inventive visible light communication system and method for effectively compensating for non-linear distortion attributed to the non-linearity of a light source or a light receiving device.

In accordance with an aspect of exemplary embodiments of the present invention, there is provided a transmitter in a visible light communication system, in which a plurality of light sources emit light in different colors, a data converter converts data to predetermined chromaticity coordinates, a data transmitter emits light having a chromaticity corresponding to the chromaticity coordinates by controlling light intensity of each of the light sources, and a pre-light emitter emits light having chromaticities corresponding to all chromaticity coordinates by controlling the light intensity of each of the light sources, before the light intensity control of the data transmitter.

In accordance with another aspect of exemplary embodiments of the present invention, there is provided a receiver in a visible light communication system, in which a light receiving device receives light emitted from a plurality of light sources of a transmitter, a coordinate setter sets coordinate information representing predetermined chromaticity coordinates based on chromaticities of received light, and a data de-converter converts a chromaticity of received light to data based on the coordinate information.

As described above, the visible communication system includes the transmitter for mapping data to chromaticity coordinates and transmitted the mapped data and the receiver for recovering the original data based on the chromaticity of light received at a light receiving device. In most cases, chromaticity coordinates to which the transmitter maps data are different from chromaticity coordinates corresponding to the chromaticity of light observed by the receiver due to the characteristics of a light source, the light receiving device, or a transmission line (the characteristics of a transmission system, particularly non-linear distortion). Therefore, demodulation accuracy is decreased and error rate is increased. However, the demodulation can be performed, taking into account the characteristics of the transmission system, the demodulation accuracy can be increased, and thus the error rate can be decreased, by preliminarily emitting light of chromaticities corresponding to total chromaticity coordinates used for modulation to the receiver and setting chromaticity coordinates for demodulation based on the chromaticities of the received light by the receiver.

The pre-light emitter of the transmitter may repeat the emission of the light having the chromaticities corresponding to the total chromaticity coordinates through the plurality of the light sources, before the light intensity control of the data transmitter. In this case, the coordinator setter of the receiver set the coordinate information based on the chromaticities of the light repeatedly received at the light receiving device. As light of chromaticities corresponding to predetermined chromaticity coordinates is repeatedly transmitted and coordinate information is set based on a plurality of observed chromaticity coordinates, coordinate information can be set, taking into account the average characteristics of the transmission system. For example, when some chromaticity coordinates are set, a plurality of chromaticities are averaged for the chromaticity coordinates and the average is used for demodulation.

Further, the coordinate setter of the receiver sets the coordinate information by allocating the chromaticities of light received in a predetermined order at the light receiving device to predetermined chromaticity coordinates. As stated before, the chromaticity of light received at the receiver contains distortion caused by the characteristics of the transmission system. In wireless communication using radio frequency (RF) signals, the characteristics of a transmission system are estimated, distortion occurring in the transmission system is estimated, a parameter is calculated to compensate for the estimated distortion, and the distortion of a received signal is compensated for using the calculated parameter. Meanwhile, in the visible light communication system, the receiver simply sets the chromaticities of light as specific chromaticity coordinates without any estimation. Therefore, unnecessary computation load is avoided, a circuit configuration is simplified, and circuit design and power saving are facilitated.

In accordance with another aspect of exemplary embodiments of the present invention, there is provided a transmitter in which a plurality of light sources emit light in different colors, a data converter converts data to predetermined chromaticity coordinates, a data transmitter emits light having a chromaticity corresponding to the chromaticity coordinates by controlling light intensity of each of the light sources, and a pre-light emitter emits light having chromaticities corresponding to part of total chromaticity coordinates by controlling the light intensity of each of the light sources, before the light intensity control of the data transmitter.

In accordance with another aspect of exemplary embodiments of the present invention, there is provided a receiver in which a light receiving device receives light emitted from the plurality of light sources of the transmitter, a first coordinate setter sets first coordinate information representing part of predetermined chromaticity coordinates based on chromaticities of received light, a second coordinate setter calculates remaining chromaticity coordinates except for the part of the predetermined chromaticity coordinates using the first coordinate information and sets second coordinate information representing the calculated remaining chromaticity coordinates, and a data de-converter converts a chromaticity of received light to data based on the first or second coordinate information.

As described above, the transmitter preliminarily emits light of chromaticities corresponding to all chromaticity coordinates used for modulation to the receiver and the receiver sets specific chromaticity coordinates for demodulation based on the chromaticities of the received light. Therefore, demodulation can be performed, taking into account the characteristics of the transmission system, demodulation accuracy can be increased, and error rate can be decreased. In addition, since only a part of all the chromaticity coordinates are transmitted, the amount of data required for transmitting chromaticity coordinates can be decreased.

In accordance with another aspect of exemplary embodiments of the present invention, there is provided a method for transmitting data, in which light having chromaticities corresponding to all chromaticity coordinates is emitted by controlling light intensity of each of a plurality of light sources for emitting light in different colors, data is converted to predetermined chromaticity coordinates, and the data is transmitted by emitting light having a chromaticity corresponding to the chromaticity coordinates through control of the light intensity of each of the light sources.

In accordance with another aspect of exemplary embodiments of the present invention, there is provided a method for receiving data, in which light emitted from a plurality of light sources of a transmitter is received, coordinate information representing predetermined chromaticity coordinates is set based on chromaticities of received light, and a chromaticity of received light is converted to data transmitted by the transmitter based on the coordinate information.

As described above, the transmitter preliminarily emits light of chromaticities corresponding to all chromaticity coordinates used for modulation to the receiver and the receiver sets specific chromaticity coordinates for demodulation based on the chromaticities of the received light. Therefore, demodulation can be performed, taking into account the characteristics of the transmission system, demodulation accuracy can be increased, and error rate can be decreased.

In accordance with another aspect of exemplary embodiments of the present invention, there is provided a method for transmitting data, in which light of chromaticities corresponding to part of total chromaticity coordinates is emitted by controlling light intensity of each of a plurality of light sources that emits light in different colors, data is converted to predetermined chromaticity coordinates, and the data is transmitted by emitting light of a chromaticity corresponding to the converted chromaticity coordinates through control of the light intensity of each of the light sources.

In accordance with another aspect of exemplary embodiments of the present invention, there is provided a method for receiving data, in which light emitted from a plurality of light sources of a transmitter is received, first coordinate information representing part of total chromaticity coordinates is set based on chromaticities of the received light, remaining chromaticity coordinates except for the part of the total chromaticity coordinates are calculated based on the first coordinate information, second coordinate information representing the remaining chromaticity coordinates is set, and a chromaticity of received light is converted to data based on the first or second coordinate information.

As described above, the transmitter preliminarily emits light of chromaticities corresponding to all chromaticity coordinates used for modulation to the receiver and the receiver sets specific chromaticity coordinates for demodulation based on the chromaticities of the received light. Therefore, demodulation can be performed, taking into account the characteristics of the transmission system, demodulation accuracy can be increased, and error rate can be decreased. In addition, since only a part of all the chromaticity coordinates are transmitted, the amount of data required for transmitting chromaticity coordinates can be decreased.

Advantageous Effects of Invention

According to the present invention, the demodulation accuracy can be increased, and thus the error rate can be decreased.

In addition, since only a part of all the chromaticity coordinates are transmitted, the amount of data required for transmitting chromaticity coordinates can be decreased.

In addition, the distortion of a received symbol point that might be caused due to the non-linearity of a light source or a light receiving device can be effectively compensated for, using a simple structure.

BRIEF DESCRIPTION OF DRAWINGS

The above and other objects, features and advantages of certain exemplary embodiments of the present invention will be more apparent from the following detailed description taken in conjunction with the accompanying drawings, in which.

MODE FOR THE INVENTION

Reference will now be made in detail to the preferred embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
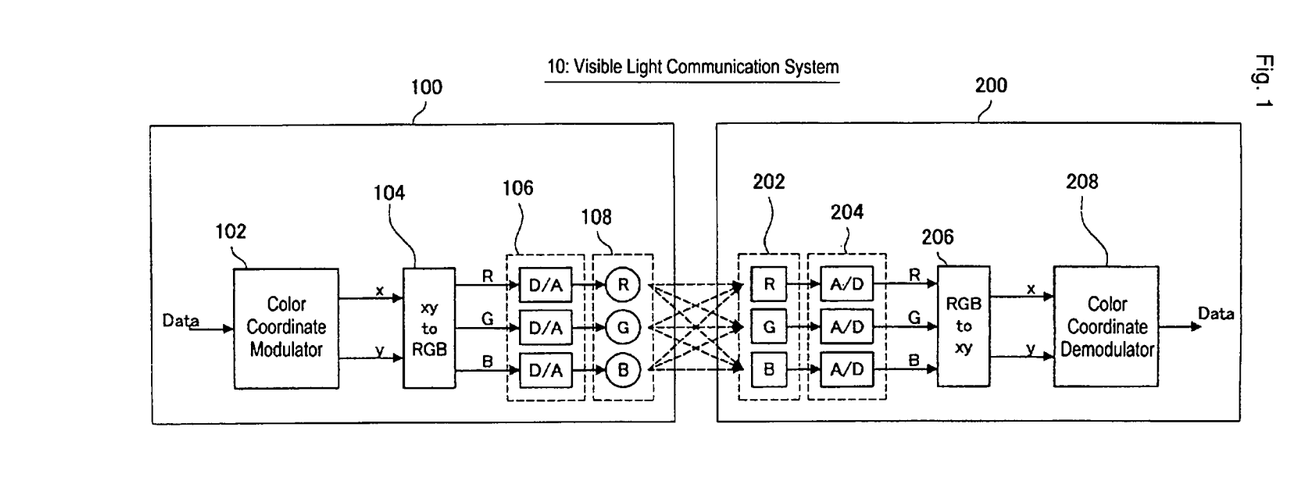
FIG. 1 is a block diagram of a visible light communication system using a multi-chromaticity coordinate scheme.
Figure 5:
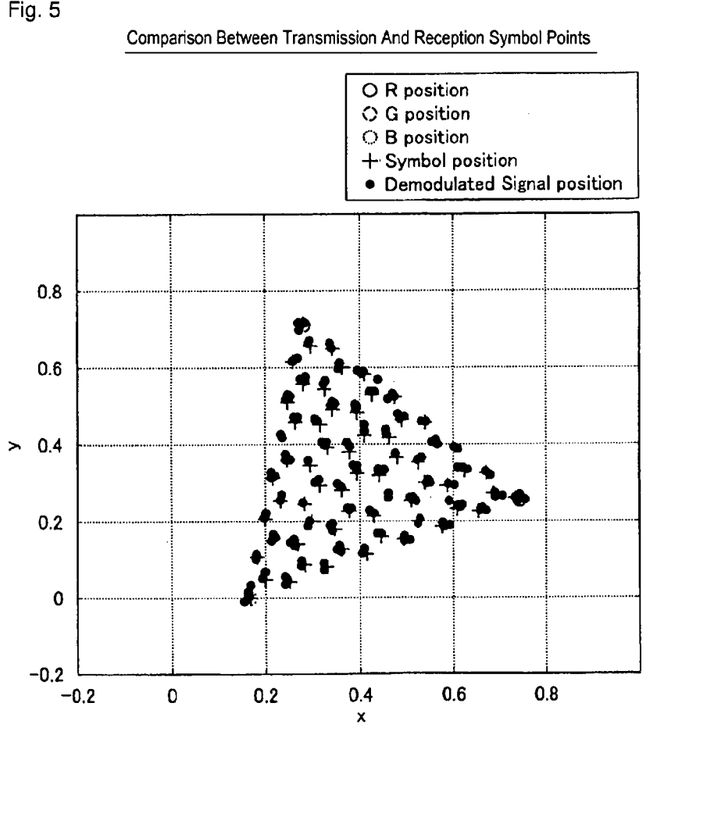
FIG. 5 illustrates deviation of a transmission/reception symbol point caused by the non-linearity of the transmission system.

A flow of descriptions of embodiments of the present invention will first be described briefly. With reference to FIG. 1, the configuration of a visible light communication system 10 using a multi-chromaticity transmission scheme will first be described. A method for modulation mapping to a chromaticity coordinate system in the multi-chromaticity transmission scheme will be described with reference to FIGS. 2 and 3. Then, the non-linearity of a transmission system in the visible light communication system 10 will be described with reference to FIGS. 4 and 5.

Thereafter, the configuration of a visible light communication system 20 according to an embodiment of the present invention will be described referring to FIG. 6. With reference to FIG. 7, the frame structures of is a block diagram of a visible light communication system according to an embodiment of the present invention a training signal and a data signal used in the visible light communication system 20 will be described. Lastly, a distortion compensation method according to the embodiment of the present invention and a BER (Bit Error Rate) improvement achieved by the distortion compensation method will be described with reference to FIGS. 8 and 9.

Before describing the embodiments of the present invention, a data transmission method based on multi-chromaticity transmission (e.g. refer to Japan Laid-Open Patent 2007-8091744) will be described in brief. The multi-chromaticity transmission scheme is the process of setting a plurality of symbol points at chromaticity coordinates in a color system, mapping data to a symbol point, and transmitting the data using light of a chromaticity corresponding to the symbol point. The light of the chromaticity corresponding to the symbol point can be obtained by appropriately controlling the light intensity of RGB LEDs and spatially multiplexing light emitted from the RGB LEDs.

Since a plurality of symbol points can be arranged at chromaticity coordinates, the multi-chromaticity transmission scheme can increase a data transmission speed without increasing the response speed of LEDs by increasing the number of bits (multiplicity) that can be allocated per symbol point. As described above, data is modulated to the ratio of intensities of R, G, B light and a total light intensity in combination in the multi-chromaticity transmission scheme. Therefore, even though the total light intensity decreases along a transmission line, the light intensity ratio is not affected. As a consequence, the original data can be demodulated with relatively high accuracy based on information about the light intensity ratio, thereby enabling fast, stable data transmission.

[1-1: Configuration of the Visible Light Communication System 10]

With reference to FIG. 1, the visible light communication system 10 using the multi-chromaticity transmission scheme will be described. FIG. 1 is a block diagram of the visible light communication system 10 using the multi-chromaticity coordinate scheme. The visible light communication system 10 maps data to a predetermined symbol point at chromaticity coordinates of a color system (refer to FIG. 2, for example) and transmits the data using light of a chromaticity corresponding to the symbol point.

Referring to FIG. 1, the visible light communication system 10 includes a transmitter 100 and a receiver 200. The transmitter 100 maps data to a predetermined symbol point and transmits the data using light of a chromaticity corresponding to the symbol point to the receiver 200. The transmitter 100 applies current pulses having appropriate current intensities to RGB light emitting devices and controls spatially multiplexed light of light emitted from the RGB light emitting devices to have the chromaticity. The receiver 200 recovers the original data by comparing the chromaticity of received light with a predetermined symbol point set at chromaticity coordinates. The configurations of the transmitter 100 and the receiver 200 will be described in more detail.

(Configuration of the Transmitter 100)

As illustrated in FIG. 1, the transmitter 100 includes a color coordinate modulator 102, a coordinate converter 104, a Digital to Analog (D/A) converter 106, and a light source 108. The light source 108 includes a plurality of light emitting devices. For example, the light source 108 includes RGB LEDs. Instead of the LEDs, the light source 108 may include a semiconductor light emitting device such as a Laser Diode (LD) or a Super Luminescent LED (SLD), a fluorescent lamp, a Cathode Ray Tube (CRT) display, a Plasma Display Panel (PDP), an organic ELectroLuminescent (EL) display, a Liquid Crystal Display (LCD), etc. The light source 108 includes a driving circuit for driving each light emitting device.

Transmission data is first provided to the color coordinate modulator 102. Upon input of the transmission data, the color coordinate modulator 102 maps the input data (i.e. a digital value) to a predetermined symbol point at chromaticity coordinates in a predetermined color system (see FIG. 2). The color system may be, for example, the Commission Internationale de l'Eclairage (CIE) color system set by the CIE such as an RGB, XYZ(Yxy), L"-u"-v"-, and L"-a"-b"-color system, a Munsell system, or an Ostwald system.

Figure 2:
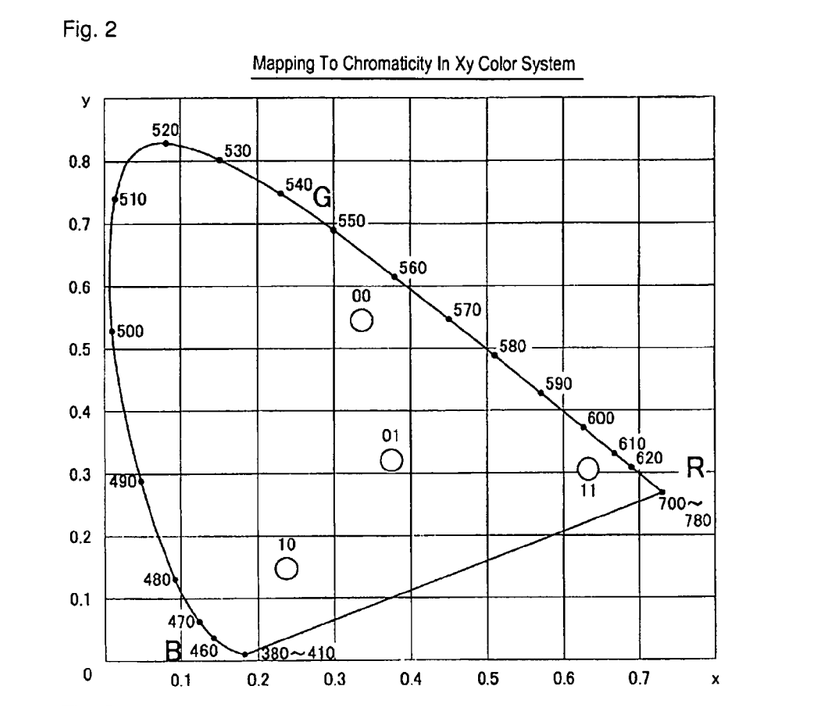
FIG. 2 illustrates an exemplary method for modulation mapping to a chromaticity coordinate system.
Figure 3:
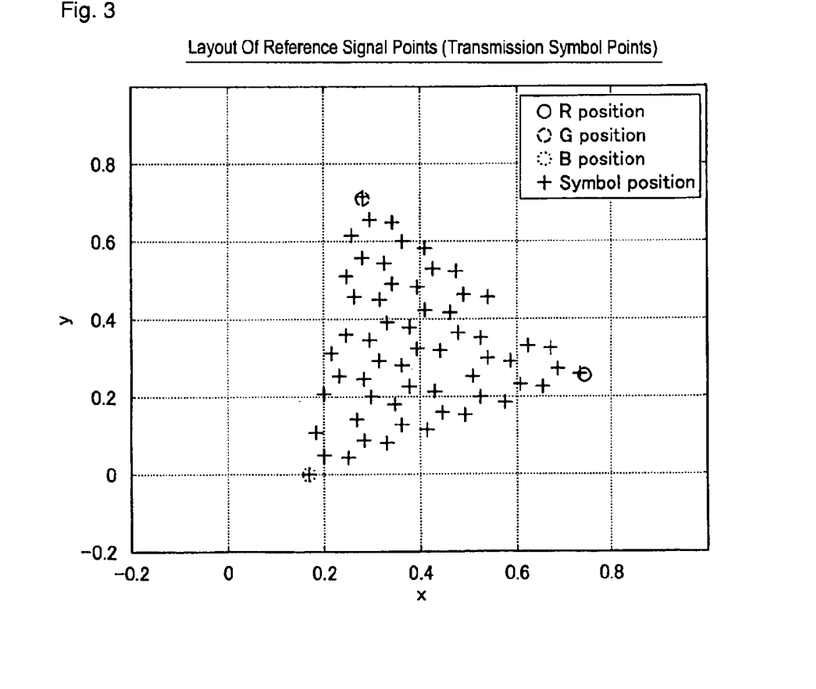
FIG. 3 illustrates an exemplary method for modulation mapping to a chromaticity coordinate system.

Modulation, that is, mapping of data to symbol points at chromaticity coordinates will be described in more detail with reference to FIG. 2. FIG. 2 illustrates the Yxz color system. In the example of FIG. 2, four symbol points are preset in correspondence with 2 bit data, 00, 01, 10 and 11. According to the layout of these symbol points, the data 10 is mapped to a symbol point with x≈0.23 and y≈0.14. While $2^{2=4}$ symbol points are defined in FIG. 2, transmission rate can be increased by defining more symbol points as illustrated in FIG. 3 (64 symbol points). Even though the number of symbol points increases, data is mapped to a symbol point in the same manner.

Referring to FIG. 1 again, after the data is mapped to a symbol point, the chromaticity coordinates (x, y) of the symbol point are input to the coordinate converter 104. The coordinate converter 104 calculates RGB luminances to reproduce a chromaticity corresponding to the chromaticity coordinates (x, y). Let the luminance of red light be denoted by R, the luminance of green light be denoted by G, and the luminance of blue light be denoted by B. Then the chromaticity coordinates (x, y) are expressed as Math Figure 1 and Math Figure 2 using the luminances (R, G, B). Reversely, the luminances (R, G, B) may be elicited from the chromaticity coordinates (x, y) using Math Figure 1 and Math Figure 2.

Math Figure 1

$$X=2.7689''\text{-}R+1.7517''\text{-}G+1.1302''\text{-}B$$

$$Y=R+4.5907''\text{-}G+0.0601''\text{-}B$$

$$Z=0.0565''\text{-}G+5.5943''\text{-}B \qquad [\text{Math.1}]$$

Math Figure 2

$$x=X/(X+Y+Z)$$

$$y=Y/(X+Y+Z) \qquad [\text{Math.2}]$$

Therefore, the coordinate converter 104 converts the chromaticity coordinates (x, y) to the luminances (R, G, B) based on Math Figure 1 and Math Figure 2. Upon receipt of the luminances (R, G, B), the D/A converter 106 generates driving voltages corresponding to the luminances (R, G, B) and applies the driving voltages to the light source 108 for emitting RGB light. The respective light emitting devices of the light source 108 emit light having the luminances (R, G, B). The light is spatially multiplexed and transmitted to the receiver 200.

If lighting devices corresponding to Pulse Width Modulation (PWM) control are used in the light source 108, it is difficult to reproduce the luminances (R, G, B) with 1 pulse light. Therefore, the luminances (R, G, B) may be reproduced by accumulating light emitted from the light source 108 for a predetermined time. In this case, the intensity of light emitted from the light source 108 is accumulated for each color and the luminances (R, G, B) can be achieved using the accumulated light intensities. For example, the influence of the PWM control may be eliminated by mapping the accumulated light intensities to the chromaticity coordinates (x, y) according to a PWM period.

The configuration of the transmitter 100 has been described so far.

(Configuration of the Receiver 200)

Now a description will be given of the configuration of the receiver 200.

Referring to FIG. 1, the receiver 200 includes a light receiving device 202, an Analog to Digital (A/D) converter 204, a coordinate converter 206, and a color coordinate demodulator 208. The light emitting device 202 includes color filters and optoelectric converters for the respective colors. The optoelectric converters may be, for example, Photo Diodes (PDs) (pn-type PDs, pin-type PDs, Avalanche PDs, etc.).

The light receiving device 202 receives light from the transmitter 100, separates light of each color using a color filter, and generates current according to a received light intensity using an optoelectric converter. The A/D converter 204 converts the current received from the light receiving device 202 to a digital signal (R, G, B) according to the intensity of the current. The digital signal (R, G, B) corresponds to the luminances (R, G, B).

Upon receipt of the digital signal (R, G, B), the coordinate converter 206 converts the digital signal (R, G, B) to chromaticity coordinates (x, y) using Math Figure 1 and Math Figure 2. Upon receipt of the chromaticity coordinates (x, y), the color coordinate demodulator 208 compares the received chromaticity coordinates (x, y) with the symbol points at chromaticity coordinates, selects a symbol point most approximate to the chromaticity coordinates (x, y), and outputs data corresponding to the selected symbol point.

The configuration of the receiver 200 has been described so far.

Since the visible light communication system 10 maps data to a symbol point at chromaticity coordinates as described above, data of a multi-value number exceeding the number of light emitting devices included in the light source 108 can be transmitted. As a consequence, the amount of data transmittable using one pulse is increased and high-rate data transmission is enabled. In addition, data is carried in the luminance ratio of color light and thus light intensity attenuation on a transmission line can be reduced. Therefore, a transmission error rate can be decreased. Further because symbol points can be positioned at any chromaticity coordinates, the design freedom of light color or transmission rate is high. Compared to other multi-color scheme, this scheme is robust against light attenuation on a transmission line or disturbance.

[1-2 Non-linear Distortion]

The use of the multi-chromaticity transmission scheme leads to excellent transmission characteristics. However, a transmission signal is a multi-level modulation signal in the multi-chromaticity transmission scheme. Thus to maintain the excellent transmission characteristics, the linearity of a transmission is required for each of RGB. If the light emitting devices and driving circuit of the light source 108, the optical transmission line, and the optoelectric converters of the light receiving device 202 (hereinafter, referred to as a transmission system) are non-linear, the transmission characteristics are deteriorated. For example, when transmission symbol points (cross points) illustrated in FIG. 3 are transmitted in a transmission system having non-linearity illustrated in FIG. 4, deviations from black round transmission symbol points illustrated in FIG. 5 result. The resulting error in data demodulation decreases transmission quality.

General LEDs are not designed for visible light communication and thus sufficient linear characteristics cannot be expected from the LEDs. Especially, a driving circuit for lighting LEDs operates on the premise of large-current control and they are not designed, taking into account linearity. Therefore, when the multi-chromaticity transmission scheme is applied to a visible light communication system using general lighting devices, transmission quality is degraded due to the non-linearity of a transmission system. However, a non-linearity compensation method used for a wireless communication system is not effective because it requires a large circuit or large power consumption. Accordingly, the present inventor proposes a method for compensating for the degradation of transmission quality caused by the non-linearity of a transmission system with a simplified structure for a visible light communication system, which will be described below in detail.

2 Embodiment

An embodiment of the present invention provides a method for compensating for the degradation of transmission quality caused by the non-linearity of a transmission system in visible light communication using the multi-chromaticity transmission scheme.

[2-1 Configuration of Visible Light Communication System 20]

Figure 6:
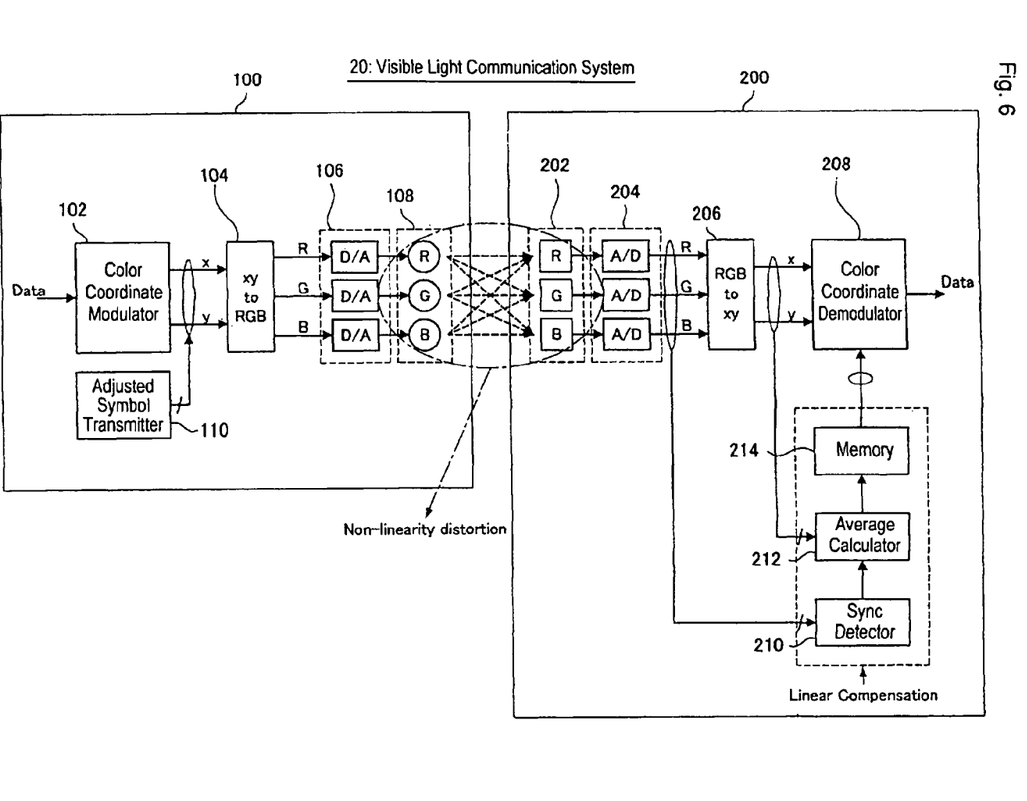
FIG. 6 is a block diagram of a visible light communication system according to an embodiment of the present invention.
Figure 7:
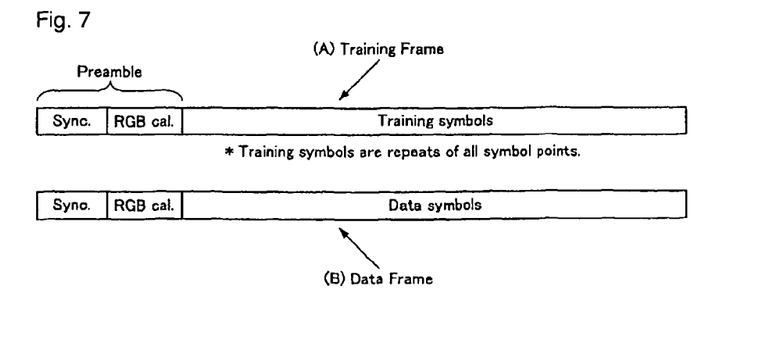
FIG. 7 illustrates the frame structures of a training signal and a data signal according to an embodiment of the present invention.

Referring to FIG. 6, the configuration of the visible light communication system 20 according to an embodiment of the present invention will be described below. FIG. 6 is a block diagram of a visible light communication system according to an embodiment of the present invention. The visible light communication system 20 is an application of the technology according to this embodiment to the visible light communication system 10 illustrated in FIG. 1. The same reference numerals denote substantially same components of the visible light communication system 10.

Referring to FIG. 6, the visible light communication system 20 includes the transmitter 100 and the receiver 200. The transmitter 100 maps data to a predetermined symbol point and transmits the data to the receiver 200 by light having a chromaticity corresponding to the symbol point. The transmitter 100 applies current pulses of appropriate intensities to R, G, B light emitting devices and controls a spatially multiplexed light of light emitted from the respective light emitting devices to have the chromaticity.

The receiver 200 recovers the original data by comparing the chromaticity of the light received from the transmitter 100 with the predetermined symbol point at chromaticity coordinates. If the transmission system is non-linear, deviation from the symbol point is large and thus demodulation errors occur. Therefore, the visible light communication system 20 appropriately updates information (hereinafter, referred to as coordinate information) about predetermined symbol points retained in the receiver 200 and replaces the coordinate information about the symbol points with coordinate information reflecting the non-linearity of the transmission system. The configurations of the transmitter 100 and the receiver 200 will be described below in great detail.

(Configuration of the Transmitter 100)

As illustrated in FIG. 6, the transmitter 100 includes the color coordinate modulator 102, the coordinate converter 104, the D/A converter 106, the light source 108, and an adjusted symbol transmitter 110. The light source 108 includes a plurality of light emitting devices. For example, the light source 108 includes RGB LEDs. Instead of the LEDs, the light source 108 may include a semiconductor light emitting device such as an LD or an SLD, a fluorescent lamp, a CRT display, a PDP, an organic EL display, an LCD, etc. The light source 108 includes a driving circuit for driving each light emitting device.

Transmission data is first provided to the color coordinate modulator 102. Upon input of the transmission data, the color coordinate modulator 102 maps the input data (i.e. a digital value) to a predetermined symbol point at chromaticity coordinates in a predetermined color system. The color system may be, for example, the CIE color system set by the CIE such as an RGB, XYZ(Yxy), L"-u"-v"-, and L"-a"-b"-color system, a Munsell system, or an Ostwald system.

After the data is mapped to a symbol point, the chromaticity coordinates (x, y) of the symbol point are input to the coordinate converter 104. The coordinate converter 104 converts the chromaticity coordinates (x, y) to luminances (R, G, B) according to Math Figure 1 and Math Figure 2. Upon receipt of the luminances (R, G, B), the D/A converter 106 generates driving voltages corresponding to the luminances (R, G, B) and applies the driving voltages to the light source 108 for emitting RGB light. The respective light emitting devices of the light source 108 emit light having the luminances (R, G, B). The light is spatially multiplexed and transmitted to the receiver 200.

This data transmission scheme is substantially identical to the data transmission scheme in the visible light communication system 10. However, the transmitter 100 according to the present invention further includes the adjusted symbol transmitter 110. The adjusted symbol transmitter 110 is means for transmitting a training signal needed to update the coordinate information preserved in the receiver 200. To distinguish from the training signal, a transmission signal obtained by modulating data is referred to as a data signal. The adjusted symbol transmitter 110 sequentially inputs the chromaticity coordinates (x, y) of all symbol points set in a color system to the coordinate converter 104. The transmission order of a symbol point transmitted as the training signal is preset.

Upon receipt of chromaticity coordinates (x, y), the coordinate converter 104 converts the chromaticity coordinates (x, y) to luminances (R, G, B) according to Math Figure 1 and Math Figure 2. Upon receipt of the luminances (R, G, B), the D/A converter 106 generates driving voltages corresponding to the luminances (R, G, B) and applies the driving voltages to the light source 108 for emitting RGB light. The respective light emitting devices of the light source 108 emit light having the luminances (R, G, B). That is, light having chromaticities corresponding to all symbol points are sequentially transmitted to the receiver 200.

The configuration of the transmitter 100 has been described so far.

(Frame Structures)

Referring to FIG. 7, the frame structures of a training signal A and a data signal B according to an embodiment of the present invention will be described. The training signal A and the data signal B have the frame structures illustrated in FIG. 7. As illustrated in FIG. 7, each of the training signal A and the data signal B has a preamble signal at the start. The preamble signal includes a synchronization signal Sync. for use in signal detection and timing synchronization and a calibration signal RGB cal. for use in RGB calibration. RGB calibration refers to correcting strength balance in RGB signals generated from the transmission system or cancelling interference among the RGB signals.

When the non-linearity of the transmission system is compensated for, the transmission frame of the training signal A (hereinafter, referred to as a training frame) is transmitted before the transmission frame of the data signal A (hereinafter, referred to as a data frame) is transmitted. Notably, the visible light communication system 20 does not always transmit a training system each time it transmits a data frame. Rather, the visible light communication system 20 transmits a training system periodically or at a predetermined timing. As illustrated in FIG. 7, the training frame is divided into a leading part with the preamble signal and a trailing part with training symbols. The trailing part includes chromaticity coordinates $Ci=(xi, yi)$ for all symbol points.

For example, in the case of the layout of symbol points illustrated in FIG. 3, chromaticity coordinates $C1, C2, \ldots, C64$ of 64 symbol points are included in the trailing part. If the training frame is sufficiently long, the chromaticity coordinates $C1, C2, \ldots, C64$ are repeated in the trailing part. Therefore, the trailing part of the training frame received at the receiver 200 contains chromaticity coordinates $C1', C2', \ldots, C64'$ different from the chromaticity coordinates $C1, C2, \ldots, C64$ due to the non-linearity of the transmission system. As described later, the receiver 200 according to the embodiment of the present invention sets the chromaticity coordinates $C1', C2', \ldots, C64'$ as new coordinate information and demodulates data transmitted in the data frame based on the new coordinate information.

So far, the frame structures have been described.

(Configuration of the Receiver 200)

Now a description will be given of the configuration of the receiver 200.

Referring to FIG. 6, the receiver 200 includes the light receiving device 202, the A/D converter 204, the coordinate converter 206, the color coordinate demodulator 208, a sync detector 210, an average calculator 212, and a memory 214. The light emitting device 202 includes color filters and optoelectric converters for the respective colors. The optoelectric converters may be, for example, PDs (pn-type PDs, pin-type PDs, Avalanche PDs, etc.).

The light receiving device 202 receives light from the transmitter 100, separates light of each color using a color filter, and generates current according to a received light intensity using an optoelectric converter. The A/D converter 204 converts the current received from the light receiving device 202 to a digital signal (R, G, B) according to the intensity of the current. The digital signal (R, G, B) corresponds to the luminances (R, G, B).

Upon receipt of the digital signal (R, G, B), the coordinate converter 206 converts the digital signal (R, G, B) to chromaticity coordinates (x, y) using Math Figure 1 and Math Figure 2. Upon receipt of the chromaticity coordinates (x, y), the color coordinate demodulator 208 compares the received chromaticity coordinates (x, y) with the symbol points at chromaticity coordinates, selects a symbol point most approximate to the chromaticity coordinates (x, y), and outputs data corresponding to the selected symbol point.

This data reception method is substantially identical to the data reception method used in the visible light communication system 10. In accordance with the embodiment of the present invention, the receiver 200 further includes the sync detector 210, the average calculator 212, and the memory 214. These components are means for updating coordinate information based on a training frame received from the transmitter 100.

Regarding the training frame, light emitted from the transmitter 100 is received at the light receiving device 202. The light receiving device 202 separates light of each color using a color filter and generates current according to a received light intensity using an optoelectric converter. The A/D converter 204 converts the current received from the light receiving device 202 to a digital signal according to the intensity of the current. The sync detector 210 detects a synchronization signal from the digital signal of the training frame, and determines the arrival and start of the training frame according to the detection result.

The sync detector 210 determines whether the input digital signal is a training frame or a data frame based on the type of the synchronization signal. The synchronization signal uses, for example, a Pseudorandom Noise (PN) code, especially an M-series code having excellent auto-correlation characteristics, suitable for timing detection. For instance, if different M-series codes are assigned to the synchronization signals of the training frame and the data frame, the sync detector 210 may distinguish the training frame from the data frame using the different M-series codes. If the input digital signal is a training frame, the sync detector 210 notifies the other components of the arrival of the training frame so as to initiate updating of the coordinate information.

First, the coordinate converter 206 converts a digital signal (R, G, B) in the trailing part of the training frame to chromaticity coordinates $Ci'=(xi', yi')$. The chromaticity coordinates $Ci'$ are input to the average calculator 212. In the case of the layout of symbol points in FIG. 3, the chromaticity coordinates $C1', C2', \ldots, C64'$ are input to the average calculator 212. The average calculator 212 stores the input chromaticity coordinates $C1', C2', C64'$ as new coordinate information. That is the average calculator 212 updates the coordinate information. After the update, the color coordinate demodulator 208 recovers the original data based on the updated coordinate information.

If the training frame is long enough and a training signal is repeated in the trailing part, a plurality of sets each including the chromaticity coordinates $C1', C2', \ldots, C64'$ are input to the average calculator 212. Then the average calculator 212 calculates the average $C1'', C2'', \ldots, C64''$ of the plurality of sets each including the chromaticity coordinates $C1', C2', \ldots, C64'$ and stores the average chromaticity coordinates $C1'', C2'', \ldots, C64''$ in the memory 214. That is, the average calculator 212 updates the coordinate information. After the update, the color coordinate demodulator 208 recovers the original data based on the updated coordinate information.

If a plurality of training frames are consecutively transmitted, a plurality of chromaticity coordinates $C1', C2', C64'$ are consecutively input to the average calculator 212. Then the average calculator 212 calculates the average $C1'', C2'', \ldots, C64''$ of the plurality of sets each including the chromaticity coordinates $C1', C2', \ldots, C64'$ and stores the average chromaticity coordinates $C1'', C2'', \ldots, C64''$ in the memory 214. That is, the average calculator 212 updates the coordinate information. After the update, the color coordinate demodulator 208 recovers the original data based on the updated coordinate information.

In this manner, the receiver 200 according to the embodiment of the present invention sets the reception results of all symbol points transmitted as a training signal as coordinate information. The receiver 200 demodulates data using the coordinate information. That is, the receiver 200 does not need processes or processing circuits for estimating deviations from symbol points during training or compensating received data symbols based on the estimates during data demodulation. As described above, the visible light communication system 20 compensates for non-linear distortion with a simplified structure. Since the main cause of non-linear distortion is the light source 108, the visible light communication system 20 can compensate for the non-linear distortion if coordinate information can be achieved, taking into account fixed characteristics of the light source 108.

The configuration of the receiver 200 has been described so far.

[2-2 Effects of Distortion Compensation]

Figure 8:
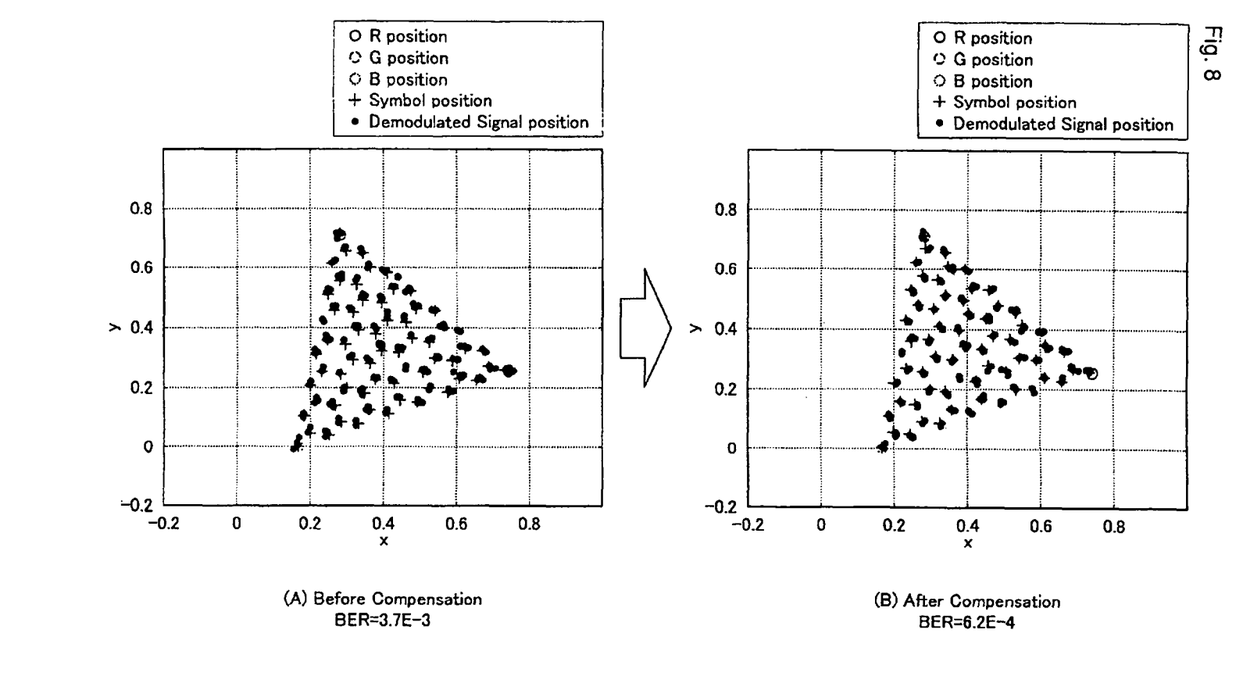
FIG. 8 illustrates a distortion compensation method according to an embodiment of the present invention and a BER improvement effect achieved by applying the distortion compensation method.
Figure 9:
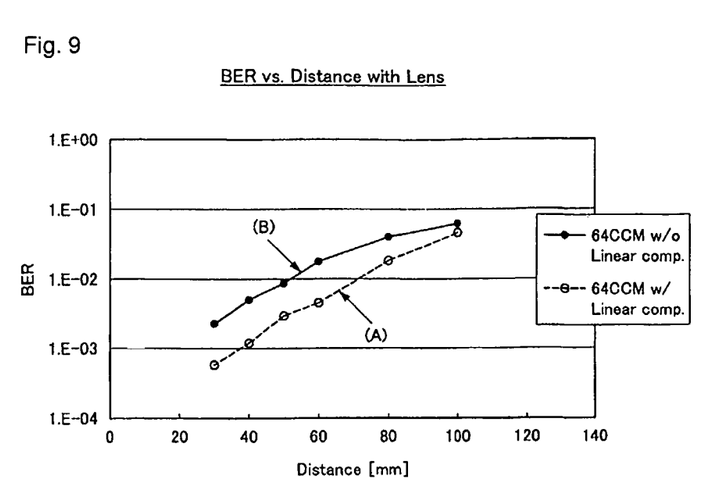
FIG. 9 is a graph illustrating a BER improvement effect achieved by applying the distortion compensation method according to the embodiment of the present invention.

Now a description will be given of effects that can be achieved when the compensation method according to the embodiment of the present invention is applied, with reference to FIGS. 8 and 9. FIG. 8 illustrates a comparison between transmission symbol points and received symbol points before distortion compensation (A) and a comparison between transmission symbol points and received symbol points after distortion compensation (B). As noted from (A) and (B) of FIG. 8, the distance between symbol points (+) in coordinate information for demodulation and chromaticity coordinate points (black round points) of received data is narrowed. In (A), BER=3.7×10−3 and in (B), BER=6.2×10−4. The compensation method according to the embodiment of the present invention improves BER remarkably. This improvement effect is verified from the BER comparison results illustrated in FIG. 9.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims.

For example, all symbol points are transmitted in a training signal in the above description. However, the method for compensating for non-linear distortion according to the present invention does not always need transmission of all symbol points. For instance, some symbol points may be transmitted in a training signal and a receiver may calculate the other symbol points based on the received symbol points. Thus, a training operation may be shortened in time. As a consequence, overall throughput can be increased. In addition, the other symbol points are calculated in the average calculator 212.

Accordingly, the invention should not be limited to the specific embodiments described herein, but should be accorded the broadest scope consistent with the principles and novel features disclosed herein.

The invention claimed is:

1. A transmitting apparatus in a visible light communication system, the transmitter comprising:
a controller configured to:
convert a data signal to at least one chromaticity of a set of predetermined chromaticity coordinates, and
convert a training signal to chromaticities corresponding to each chromaticity coordinate of the set of predetermined chromaticity coordinates;
an adjusted symbol transmitter configured to transmit the training signal to the controller; and
a transmitter configured to:
pre-emit light having all chromaticities corresponding to each chromaticity coordinate of the set of predetermined chromaticity coordinates corresponding to the converted training signal, and
after the pre-emission of the light, emit light having the at least one chromaticity corresponding to the converted data signal by controlling a light intensity of each light source of a plurality of light sources for emitting light in different colors.

2. The transmitting apparatus of claim 1, wherein the transmitter is further configured to repeat the pre-emission of the light having all chromaticities corresponding to the converted training signal through the plurality of the light sources, before the emission of the light having the at least one chromaticity corresponding to the converted data signal.

3. The transmitting apparatus of claim 1, wherein the transmitter is further configured to pre-emit the light having all chromaticities corresponding to the converted training signal through the plurality of the light sources in a predetermined order.

4. A receiving apparatus in a visible light communication system, the receiver comprising:
a receiver configured to:
receive pre-emitted light having chromaticities corresponding each chromaticity coordinate of a set of predetermined chromaticity coordinates from a plurality of light sources of a transmitter, and
after receiving the pre-emitted light, receive light emitted from the plurality of light sources of the transmitter, wherein the pre-emitted light comprises a training signal and the emitted light comprises data;
a sync detector configured to:
detect the training signal, and
send a result of the detecting of the training signal to a controller; and
the controller configured to:
set coordinate information representing all of the predetermined chromaticity coordinates based on the chromaticities of the pre-emitted light and the notifying the detection result, and
convert a chromaticity of the received light to the data based on the coordinate information.

5. The receiving apparatus of claim 4, wherein the controller is further configured to set the coordinate information based on the chromaticities of the pre-emitted light received repeatedly through the receiver.

6. The receiving apparatus of claim 4, wherein the controller is further configured to set the coordinate information by allocating the chromaticities of the pre-emitted light received in a predetermined order through the receiver to the predetermined chromaticity coordinates.

7. A receiving apparatus in a visible light communication system, the system comprising:
a receiver configured to:
receive a first pre-emitted light having a first chromaticity before receiving the light emitted from a plurality of light sources of a transmitter, and
after receiving the first pre-emitted light, receive light emitted from the plurality of light sources of the transmitter, wherein the first pre-emitted light comprises a training signal and the emitted light comprises data; and
a sync detector configured to:
detect the training signal, and
send the detection result to a controller,
wherein the controller is configured to:
set the first chromaticity to first coordinate information representing part of predetermined chromaticity coordinates, calculate remaining chromaticity coordinates except for the part of the predetermined chromaticity coordinates using the first coordinate information, set the calculated remaining chromaticity coordinates to second coordinate information, and convert a chromaticity of the received light to the data based on the first or second coordinate information and the sent detection result.

8. A method for transmitting data using visible light, the method comprising:

converting a training signal to chromaticities corresponding to each chromaticity coordinate in a set of predetermined chromaticity coordinates;

transmitting the converted training signal by pre-emitting light having the chromaticities corresponding to each chromaticity coordinate in the set of predetermined chromaticity coordinates by controlling a light intensity of each light source of a plurality of light sources for emitting light in different colors; and converting data to at least one chromaticity of the set of predetermined chromaticity coordinates; and transmitting the converted data by emitting light having the at least one chromaticity corresponding to the converted data by controlling light intensity of each of the light sources of the plurality of light sources.

9. A method for receiving data using visible light, the method comprising:

receiving pre-emitted light having chromaticities corresponding to each chromaticity coordinate in a set of predetermined chromaticity coordinates;

detecting a training signal from the pre-emitted light;

setting coordinate information representing all each chromaticity coordinate in the set of predetermined chromaticity coordinates based on the chromaticities of the pre-emitted light;

receiving light emitted from a plurality of light sources of a transmitter and setting each chromaticity coordinate in the set of the predetermined chromaticity coordinates; and converting a chromaticity of the received light to data based on the coordinate information, wherein the pre-emitted light comprises the training signal and the emitted light comprises the data.

10. A method for receiving data using visible light, the method comprising:

receiving a first pre-emitted light having a first chromaticity from a plurality of light sources of a transmitter;

detecting a training signal from the first pre-emitted light;

setting the first chromaticity to first coordinate information representing part of a set of predetermined chromaticity coordinates;

calculating a remaining set of chromaticity coordinates except for a part of the set of predetermined chromaticity coordinates based on the first coordinate information and setting the calculated remaining set of chromaticity coordinates to second coordinate information;

after receiving the first pre-emitted light from the plurality of light sources of the transmitter, receiving light emitted from the plurality of light sources of the transmitter; and converting a chromaticity of the received light to data based on the first coordinate information or the second coordinate information, wherein the first pre-emitted light comprise the training signal and the emitted light comprises the data.

* * * * *